(12) United States Patent
Inoue et al.

(10) Patent No.: US 7,369,208 B2
(45) Date of Patent: May 6, 2008

(54) LIQUID CRYSTAL DISPLAY DEVICE

(75) Inventors: Daisuke Inoue, Kawasaki (JP); Hideki Ito, Kawasaki (JP); Hiromitsu Tanaka, Isumi (JP); Takashi Kamino, Izumi (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 522 days.

(21) Appl. No.: 11/151,353

(22) Filed: Jun. 14, 2005

(65) Prior Publication Data

US 2005/0275787 A1    Dec. 15, 2005

(30) Foreign Application Priority Data

Jun. 15, 2004    (JP) ............................. 2004-177528

(51) Int. Cl.
*G02F 1/1339* (2006.01)
*G02F 1/1343* (2006.01)

(52) U.S. Cl. ....................................... 349/155; 349/141

(58) Field of Classification Search ................ 349/155, 349/141

See application file for complete search history.

(56) References Cited

U.S. PATENT DOCUMENTS

| | | | |
|---|---|---|---|
| 6,317,188 B1* | 11/2001 | Shibahara | 349/155 |
| 2001/0026347 A1* | 10/2001 | Sawasaki et al. | 349/156 |
| 2005/0237470 A1* | 10/2005 | Kadotani | 349/155 |
| 2007/0085967 A1* | 4/2007 | Park et al. | 349/156 |

FOREIGN PATENT DOCUMENTS

JP    2002-182220    6/2002

* cited by examiner

*Primary Examiner*—Mike Qi
(74) *Attorney, Agent, or Firm*—Young & Thompson

(57) ABSTRACT

First and second columnar spacers are formed on a color filter substrate, and step films are formed on an active matrix substrate in the same step as signal lines. The columnar spacers are formed by proximity exposure, and the step films are formed by being exposed by a lens projection system. In plan view, the step films are disposed inside the columnar spacers. The first columnar spacers are made to be in contact with the regions of the protective film that are higher in elevation with the step films in the active matrix substrate.

6 Claims, 5 Drawing Sheets

LIQUID CRYSTAL DISPLAY DEVICE

BACKGROUND OF THE INVENTION

1. Field of the Invention

The present invention relates to a liquid crystal display device which has two substrates opposed to each other via columnar spacers disposed therebetween.

2. Description of the Related Art

A liquid crystal display device is formed of two glass substrates opposed to each other with a uniform distance (gap) therebetween, and of a liquid crystal layer disposed between these substrates. In such a liquid crystal display device, in order to have a uniform gap between the two glass substrates, a plurality of spacers are formed between the two glass substrates. Spacers are classified into columnar spacers which are formed on a substrate by being patterned to extend toward the other substrate, and spherical spacers which are dispersed inside a liquid crystal layer.

FIG. 1 is a cross sectional view showing a conventional liquid crystal display device provided with columnar spacers. As shown in FIG. 1, this conventional liquid crystal display device has a glass substrate 101. Scan lines 102 are formed on the glass substrate 101, and an insulating protective film 103 is formed so as to coat the scan lines 102. Signal lines (not illustrated), pixel electrodes (not illustrated) and the like are formed on the insulating protective film 103. Another insulating protective film 104 is formed on the protective film 103 so as to coat the signal lines and the pixel electrodes. This arrangement forms TFTs (Thin Film Transistors, not illustrated) in which the signal lines are connected to the drain, the pixel electrodes are connected to the source, and the scan lines 102 are connected to the gate. This is the structure of an active matrix substrate 105.

On the other hand, another glass substrate 106 is disposed opposed to the glass substrate 101, and a black matrix (BM) 107 is formed on the surface of the glass substrate 106 that is opposed to the active matrix substrate 105. The black matrix 107 is disposed in regions including the regions corresponding to the scan lines 102 of the active matrix substrate 105. On the black matrix 107 are provided color filters (CF) 108. A protective film 109 is formed so as to coat the black matrix 107 and the color filters 108. This is the structure of a color filter substrate 110.

Inside the regions where the black matrix 107 and the color filters 108 are overlapped with each other on the color filter substrate 110, columnar spacers 111 made of acrylic resin or the like are formed to extend toward the active matrix substrate 105. The tip of each of the columnar spacers 111 is in contact with a part of the region directly above each of the scan lines 102 of the protective film 104 of the active matrix substrate 105. Between the active matrix substrate 105 and the color filter substrate 110, liquid crystal 112 is filled to form a liquid crystal layer.

However, this conventional liquid crystal display device has the following problems. When an external force is applied on the glass substrates 101 and 106, thereby dislocating the active matrix substrate 105 and the color filter substrate 110 in the direction parallel to the substrates, the frictional force between the columnar spacers 111 and the protective film 104 prevents the dislocation between the substrates from being restored even after the external force disappears. This makes the glass substrates 101 and 106 have birefringence, thereby causing light leakage regardless of the orientation of the liquid crystal. This light leakage is particularly conspicuous in black display, and is recognized as display unevenness. A reduction in the frictional force between the columnar spacers 111 and the protective film 104 by reducing the number of the columnar spacers 111 will result in plastic deformation of the columnar spacers 111, thereby causing gap unevenness.

Japanese Patent Publication No. 2002-182220 discloses a technique to reduce the frictional force between the columnar spacers and the substrate while holding the gap between the substrates. FIGS. 2 and 3 are cross sectional views showing conventional liquid crystal display devices disclosed in this patent document, Japanese Patent Publication No. 2002-182220. The liquid crystal display device shown in FIG. 2 is provided with a glass substrate 121, and with counter voltage signal lines 122 formed thereon. The counter voltage signal lines 122 are coated with an insulating film 123 on which drain signal lines 124 are formed. A protective film 125 is formed so as to coat the drain signal lines 124, and an orientation film 126 is formed on the protective film 125. This is the structure of an active matrix substrate 127. On the surface of the active matrix substrate 127, the regions including the counter voltage signal lines 122 are higher in elevation than the other regions.

On the other hand, a glass substrate 128 opposed to the glass substrate 121 has a black matrix 129 on a surface thereof that is opposed to the active matrix substrate 127. A protective film 130 is formed so as to coat the black matrix 129. On the protective film 130 are formed a plurality of columnar spacers 131a and 131b. An orientation film 132 is formed so as to coat the protective film 130 and the columnar spacers 131a and 131b. This is the structure of a color filter substrate 133. Liquid crystal 134 is filled between the active matrix substrate 127 and the color filter substrate 133 so as to form a liquid crystal layer.

In the liquid crystal display device shown in FIG. 2, the columnar spacers 131a are formed in the positions opposed to the counter voltage signal lines 122 on the active matrix substrate 127, and the tips of the columnar spacers 131a are in contact with the elevated regions on the active matrix substrate 127. On the other hand, the remaining columnar spacers 131b are formed in the positions not opposed to the counter voltage signal lines 122 on the active matrix substrate 127, and the tips of the columnar spacers 131b are not in contact with the active matrix substrate 127.

As described above, of the plurality of columnar spacers, only the columnar spacers 131a are made to be in contact with the active matrix substrate 127, whereas the columnar spacers 131b are made not to make contact. As a result, when no external force is applied on the liquid crystal display device, the frictional force is small because only the columnar spacers 131a are made to be in contact with the active matrix substrate 127, and when an external force compressing the liquid crystal display device is applied, the columnar spacers 131a are deformed to make the tips of the columnar spacers 131b come into contact with the active matrix substrate 127. This allows the gap between the substrates to be maintained.

The aforementioned patent document, Japanese Patent Publication No. 2002-182220 also discloses a technique to provide pedestal patterns directly under some of the columnar spacers, as shown in FIG. 3. In the color filter substrate 141 of the liquid crystal display device, the surface of the glass substrate 142 is provided with a black matrix 143 and color filters 144 thereon, and pedestal patterns 145 are formed on a portion of the black matrix 143. A protective film 146 is formed so as to coat the black matrix 143, the color filters 144, and the pedestal patterns 145. On the protective film 146 are formed a plurality of columnar spacers 147a and 147b. The columnar spacers 147a are formed directly above the pedestal patterns 145, whereas the columnar spacers 147b are formed in regions outside the regions directly above the pedestal patterns 145.

Consequently, the tips of the columnar spacers 147a are at a position higher than the tips of the columnar spacers 147b by the thickness of the pedestal patterns 145. Therefore, the columnar spacers 147a are in contact with the active matrix substrate (not illustrated); however, the columnar spacers 147b are not in contact with the active matrix substrate unless an external force to compress these substrates is applied. This makes it possible to maintain the gap between the substrates, while reducing the frictional force between the columnar spacers and the active matrix substrate.

However, the aforementioned conventional liquid crystal display device has the following problems. Even if the height of the columnar spacers on the color filter substrate is made uniform in the manufacture of the liquid crystal display device, the gap between the active matrix substrate and the color filter substrate varies after the liquid crystal display device is assembled. This increases a variation in luminance, chromaticity and contrast in each liquid crystal display device.

SUMMARY OF THE INVENTION

An object of the present invention is to provide a liquid crystal display device having a uniform gap between the active matrix substrate and the color filter substrate.

The liquid crystal display device according to the present invention comprises: a color filter substrate; an active matrix substrate which is opposed to the color filter substrate; and a liquid crystal layer which is disposed between the color substrate and the active matrix substrate. The color filter substrate comprises: a first substrate; and spacers formed on a surface of the first substrate that is opposed to the active matrix substrate. The active matrix substrate comprises: a second substrate; a pixel circuit which is formed on a surface of the second substrate that is opposed to the color filter substrate; and films which are formed locally in at least some of the regions on the second substrate that are opposed to the spacers, and which make steps at the surface of the active matrix substrate. The steps are in contact with the spacers, and the contact region between the step and the spacer is disposed inside the periphery of the contact surface of the spacer.

In the present invention, the films formed locally are provided on the active matrix substrate so as to be inside the spacers when viewed in the direction perpendicular to the surface of the second substrate, and the regions including the films formed locally are in contact with the spacers. This makes it possible to determine the contact area between the active matrix substrate and the films formed locally by the size of the films formed locally. The films formed locally, which are formed on the same substrate as the pixel circuit, can be produced with high form accuracy by a semiconductor process. This makes the contact area between the active matrix substrate and the films formed locally uniform, thereby having a uniform gap between the active matrix substrate and the color filter substrate.

The pixel circuit preferably comprises scan lines; signal lines; and thin film transistors connected with the scan lines and the signal lines. And the films formed locally are preferably made of the same material as the signal lines and are preferably formed on the same layer as the signal lines. And, more preferably, the films formed locally are formed in a same step as the signal line. This allows the films formed locally to be formed without adding an additional step.

The spacers are preferably made by forming a first film on the surface of the first substrate, exposing by a proximity system, and developing the first film for patterning. And the films formed locally are preferably made by forming a second film on the surface of the second substrate, forming a resist on the second film, exposing the resist by either a lens projection system or a mirror projection system, developing the resist for patterning, and etching the second film using the patterned resist as a mask. This allows the spacers to be formed by proximity exposure at low cost, and to form the films formed locally with a high degree of accuracy either by the lens projection system or the mirror projection system.

The films formed locally are preferably formed only in some of the regions on the second substrate that are opposed to the spacers. This makes some of the spacers normally to be in contact with the active matrix substrate, thereby reducing the frictional force between the color filter substrate and the active matrix substrate. On the other hand, when an external force is applied in the direction of making the active matrix substrate and the color filter substrate approach each other, the other spacers come into contact with the active matrix substrate, thereby preventing the gap from being further reduced in size.

According to the present invention, the films formed locally are provided on the active matrix substrate so as to be inside the spacers when viewed in the direction perpendicular to the surface of the second substrate, and the regions including the films formed locally are in contact with the spacers. This makes it possible to determine the contact area between the active matrix substrate and the films formed locally by the size of the films, thereby having a uniform gap between the active matrix substrate and the color filter substrate.

DETAILED DESCRIPTION OF THE PREFERRED EMBODIMENT

In an attempt to overcome the aforementioned conventional problem, that is, there is a variation in the gap between the substrates even if the height of the columnar spacers is made uniform, the inventors of the present invention have carried out diligent experiments and research, thereby obtaining the following knowledge.

In general, in the manufacture of a liquid crystal display device, the preparation of the active matrix substrate requires the formation of a minute structure including TFTs, so that it is carried out by using a photolithography process applied for a semiconductor process. More specifically, an exposure process is performed by a lens projection system or a mirror projection system. The lens projection system is a system to form an image on a substrate by using a lens. Since the lens size to be used is limited, the lens projection system is generally performed by being combined with a stepper system for the separate exposure of the substrates. On the other hand, the mirror projection system is a system to form an image on a substrate by using a mirror, and is generally performed by being combined with an aligner system for the one-shot exposure of the substrates. The lens projection system and the mirror projection system, which form an image on a substrate, can control the line width with a high degree of accuracy.

Figure 1:
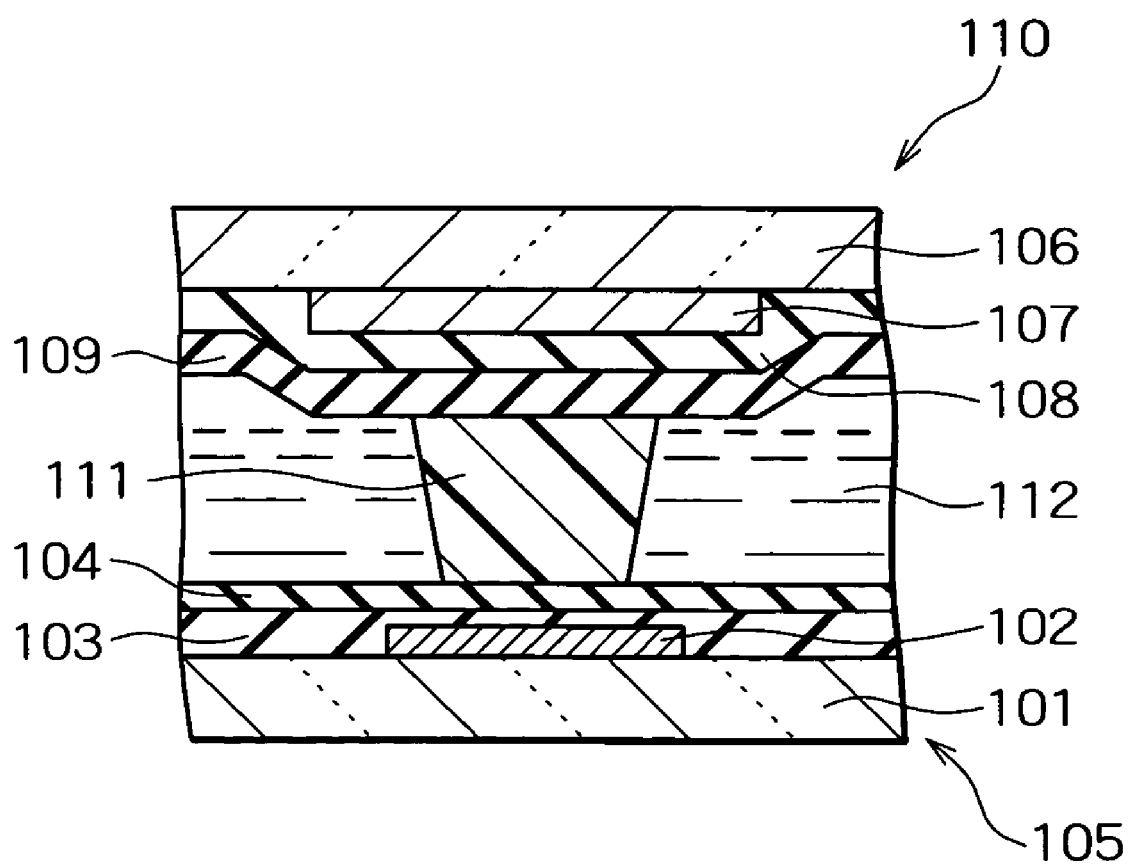
FIG. 1 is a cross sectional view showing a conventional liquid crystal display device provided with columnar spacers.
Figure 2:
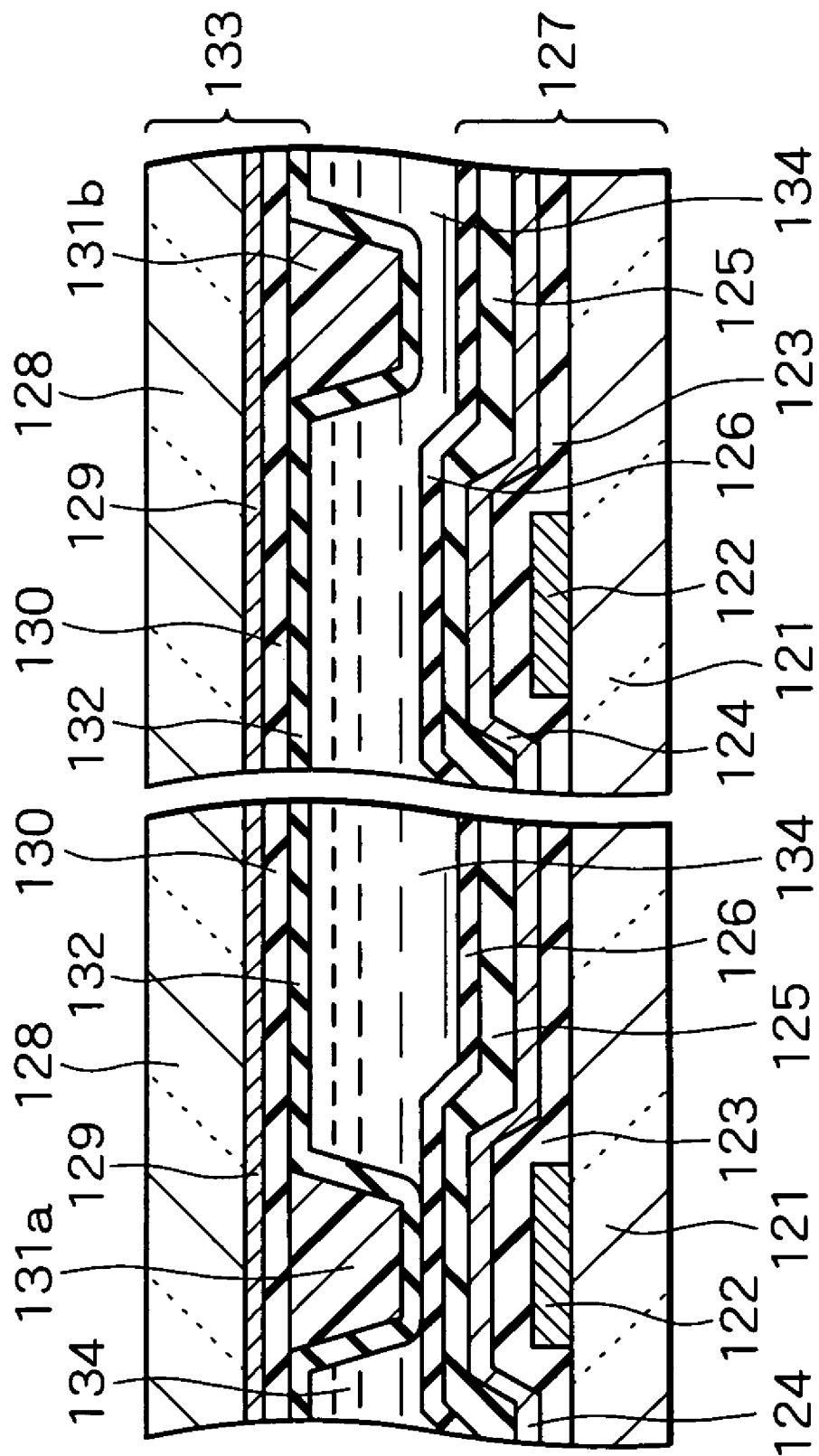
FIG. 2 is a cross sectional view showing a conventional liquid crystal display device disclosed in Japanese Patent Publication No. 2002-182220.
Figure 3:
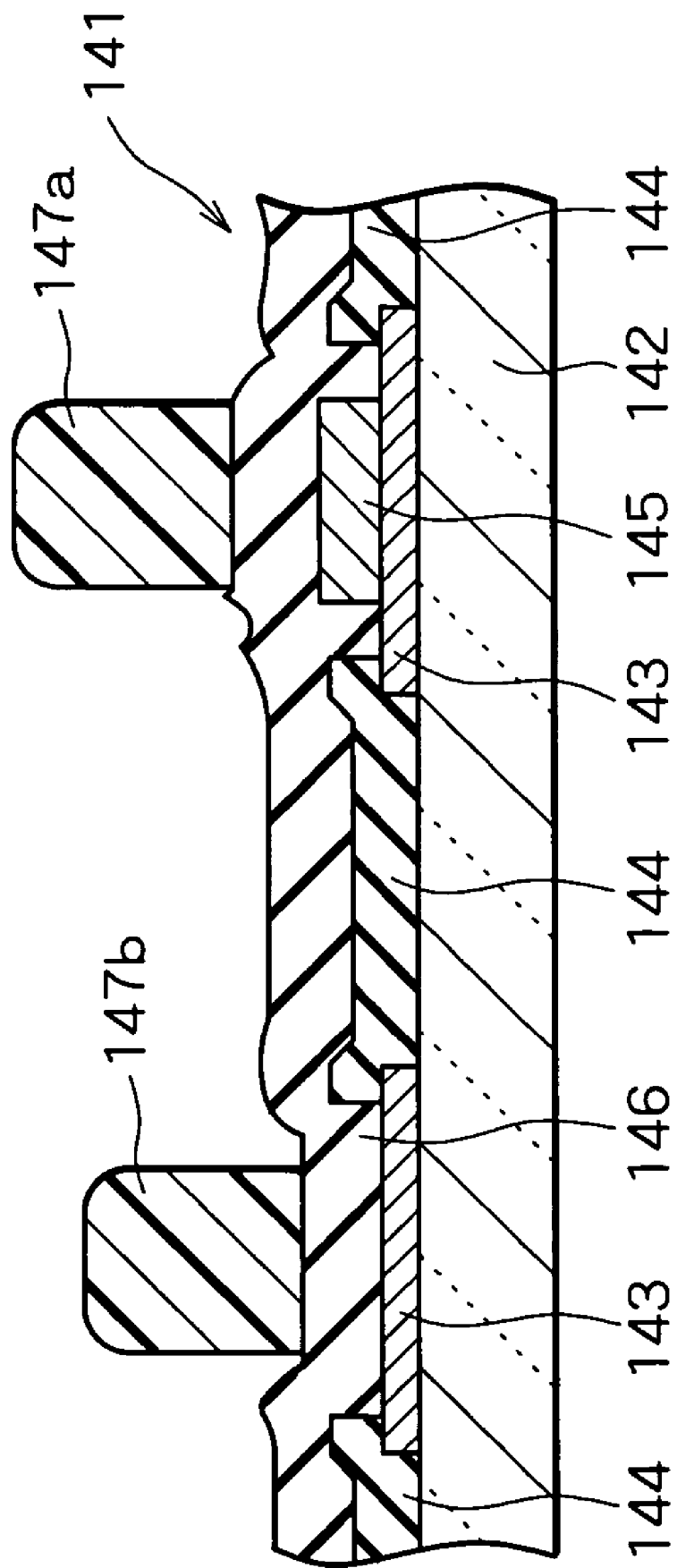
FIG. 3 is a cross sectional view showing another conventional liquid crystal display device disclosed in Japanese Patent Publication No. 2002-182220.

In contrast, in the process of preparing the color filter substrate, exposure is performed by a proximity system because it is unnecessary to form a minute structure including TFTs. The proximity system is a system to perform an exposure by parallel light without using a light-collecting means such as a lens or mirror. This provides the advantage of a lower cost than the aforementioned lens projection system and mirror projection system. On the other hand, there is the disadvantage of causing light interference due to the use of parallel light, thereby having poorer precision in controlling the exposure line width than the lens projection system and mirror projection system. Therefore, as shown in FIGS. 1 to 3, columnar spacers formed on the color filter substrate are insufficient in form accuracy, thereby changing the contact area with the active matrix substrate.

The inventors of the present invention have found that a change in the contact area between the columnar spacers and the active matrix substrate causes a change in the gap between the active matrix substrate and the color filter substrate even if the height of the columnar spacers is made uniform. In other words, when the contact area between the columnar spacers and the active matrix substrate per unit area of the display panel is small, the gap between the substrates is smaller than in the case where the contact area is large. This is considered to result from the following. When the liquid crystal display device is assembled, the substrates are compressed to each other by the atmospheric pressure and the like, thereby applying a compressive force on the columnar spacers. And if the contact area is small, the columnar spacers are prone to be elastically deformed, thereby making the gap prone to shrink. In contrast, when the contact area is large, the columnar spacers are not reliable to elastic deformation, and the gap is kept large. It may be considered possible to form the columnar spacers on the active matrix substrate; however, this is difficult in terms of process. The inventors of the present invention have developed a process of keeping the contact area constant based on the aforementioned knowledge, thus completing the present invention.

Figure 4:
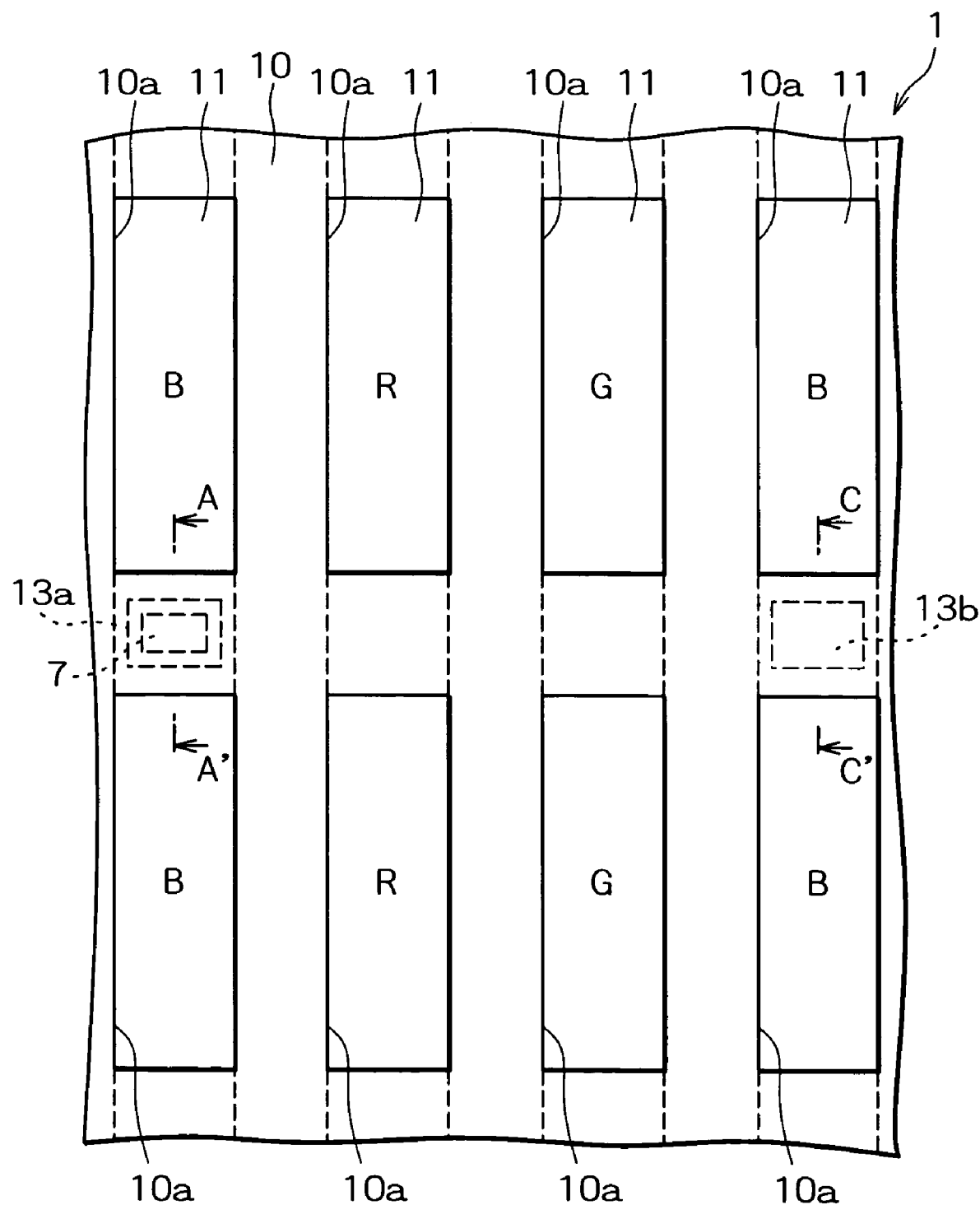
FIG. 4 is a plan view showing a liquid crystal display device according to an embodiment of the present invention.
Figure 5A:
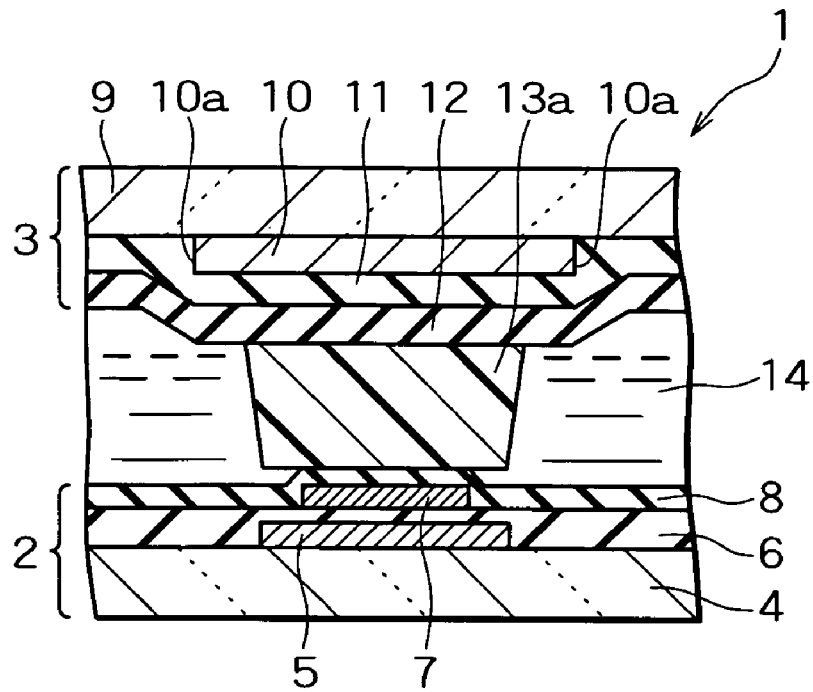
FIG. 5A is a cross sectional view taken along the line A-A' of FIG. 4.
Figure 5B:
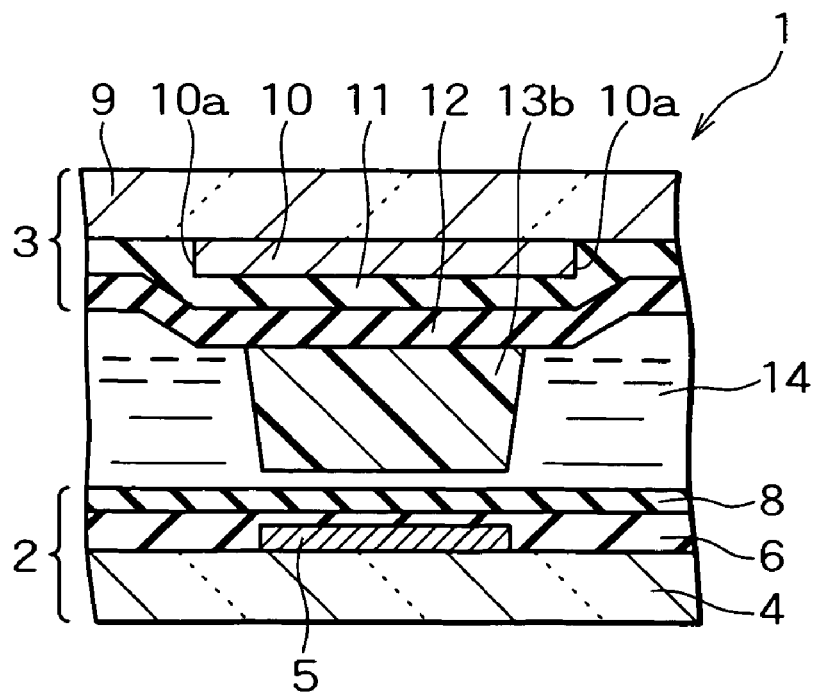
FIG. 5B is a cross sectional view taken along the line C-C' of FIG. 4.

An embodiment of the present invention will be described as follows with reference to the accompanying drawings. FIG. 4 is a plan view showing the liquid crystal display device according to the present embodiment, FIG. 5A is a cross sectional view taken along the line A-A' of FIG. 4, and FIG. 5B is a cross sectional view taken along the line C-C' of FIG. 4. As shown in FIGS. 4, 5A, and 5B, in a liquid crystal display device 1 according to the present embodiment, an active matrix substrate 2 and a color filter substrate 3 are opposed to each other. This liquid crystal display device 1 can be an IPS mode (In-Plane Switching mode) liquid crystal display device. FIG. 4 is a view of the liquid crystal display device 1 seen from the color filter substrate 3 side. This view does not contain the components other than the black matrix 10, the color filters 11, the columnar spacers 13a and 13b in the color filter substrate 3, and the step film 7 in the active matrix substrate 2.

The active matrix substrate 2 is provided with a glass substrate 4, which is a transparent insulating substrate. The surface of the glass substrate 4 that is opposed to the color filter substrate 3 is provided with scan lines 5. The scan lines 5 are coated with an insulating protective film 6, which may have a thickness of 500 to 600 nm. A film is formed locally within each of the regions directly above the scan lines 5 on the protective film 6. As mentioned bellow, the film makes step at the surface of the active matrix substrate 2. The film is referred to as the step film 7. In addition to the step films 7, signal lines (not illustrated), pixel electrodes (not illustrated), TFTs (not illustrated) and the like are formed on the protective film 6. In this arrangement, the signal lines are connected to the drains of the TFTs, the pixel electrodes are connected to the sources of the TFTs, and the scan lines 5 are connected to the gates of the TFTs.

The step films 7 are formed by being patterned in the same step as the signal lines at the same time. Consequently, the step films 7 are made of the same material as the signal lines, such as chrome (Cr), and are formed in the same layer as the signal lines. The step films 7 may be 300 nm in thickness. When seen from the direction perpendicular to the surface of the glass substrate 4 (hereinafter, in plan view), each of them is a rectangle of 7 μm in length by 12 μm in width. In addition, an insulating protective film 8 is formed so as to coat the step films 7, the signal lines, the pixel electrodes and the like. The protective film 8 may be 300 nm in thickness. As a result, the surface of the protective film 8 has asperities which reflect the arrangement of the step films 7, so that the regions directly above the step films 7 are higher in elevation than the other regions. That is, the step films 7 make steps at the surface of the active matrix substrate 2.

On the other hand, the color filter substrate 3 is provided with a glass substrate 9, which is a transparent insulating substrate. The surface of the glass substrate 9 that is opposed to the active matrix substrate 2 is provided with the black matrix (BM) 10. The black matrix 10 is arranged like a lattice so as to include the regions corresponding to the scan lines 5 of the active matrix substrate 2. In other words, the black matrix 10 is provided with rectangular openings 10a in the form of a matrix. Belt-shaped color filters (CF) 11 are formed so as to cross the black matrix 10 and to overlap with the plurality of aligned openings 10a. The color filters 11 consist of three-color filters: red (R), green (G) and blue (B), which are arranged repeatedly. In addition, a protective film 12 is formed so as to coat the color filters 11.

On the regions where the black matrix 10 and the color filters 11 are overlapped with each other on the protective film 12 of the color filter substrate 3, a plurality of columnar spacers 13a and 13b (which may be collectively referred to as the columnar spacers 13) are provided. Each of the columnar spacers 13 may be made of acrylic resin, 2 to 5 μm in height and a rectangle of 10 μm in length by 15 μm in width in plan view, extending toward the active matrix substrate 2. Liquid crystal 14 is filled between the active matrix substrate 2 and the color filter substrate 3, thereby forming a liquid crystal layer.

The positional relationship between the columnar spacers 13 and the step films 7 will be described in detail as follows. The columnar spacers 13 are formed on the regions which are directly above the black matrix 10 on the color filter substrate 3 and which are within the regions between the openings 10a where the color filters 11 of one of the three colors, e.g. blue are exposed. For example, the columnar spacers 13 are provided at a rate of one per every four regions out of the regions between the openings 10*a* where the blue color filters 11 are exposed.

On the other hand, in the active matrix substrate 2, the step films 7 are formed, e.g. at a rate of one per every four regions out of the regions opposed to the columnar spacers 13. In other words, the step films 7 are provided, e.g. at a rate of one per every 16 regions out of the regions opposed to the regions between the openings 10*a* where the blue color filters are exposed. As a result, as shown in FIG. 5A, one columnar spacer 13*a* out of four columnar spacers 13 is in contact with a region of the protective film 8 that is higher in elevation than the step films 7 in the active matrix substrate 2. As shown in FIG. 5B, three columnar spacers 13*b* out of four columnar spacers 13 are not in contact with the protective film 8 of the active matrix substrate 2 because of the absence of the step films 7 in the opposed positions. Thus, the columnar spacers 13*b* and the protective film 8 have a clearance therebetween which is filled with the liquid crystal 14.

As described above, each of the columnar spacers 13 is a rectangle of 10 µm in length by 15 µm in width in plan view, each of the step films 7 is a rectangle of 7 µm in length by 12 µm in width in plan view, and the elevated regions of the protective film 8 have nearly the same shape as the step films 7. In plan view, the step films 7 are positioned inside the columnar spacers 13. Consequently, the contact region between each columnar spacer 13 and the protective film 8 of the active matrix substrate 2 nearly agrees with the top surface of each step film 7, and is a rectangle of, e.g. 7 µm in length by 12 µm in width. The steps at the surface of the active matrix substrate 2 are in contact with the spacers 13*a*. The contact region between the step and the spacer 13*a* is disposed inside the periphery of the contact surface of the spacer 13.

The following is a description about a method for preparing the columnar spacers 13 and the step films 7. The method for forming the columnar spacers 13 will be described first. After forming the color filter substrate 3 up to the protective film 12, a negative photosensitive resist made of acrylic resin is applied on the protective film 12 by spin coating. Next, proximity exposure is performed to harden the portions of the applied photosensitive resist that are to be the columnar spacers 13. After this, unhardened portions of the photosensitive resist are removed by a developing solution. As a result, the hardened portions of the photosensitive resist are left to form the columnar spacers 13.

The following is a description about a method for forming the step films 7. The step films 7 are formed by an ordinary photolithography process. More specifically, first, the scan lines 5 and the protective film 6 are formed on the glass substrate 4. Then, a film (not illustrated) made of Cr is formed to have a thickness of, e.g. 300 nm by sputtering on the entire surface of the protective film 6. Next, a resist for TFTs (not illustrated) is applied and prebaked. Then, the pattern for forming TFTs is exposed by a lens projection system or a mirror projection system so as to harden the portions corresponding to the regions of the resist that are intended to be the step films 7. Next, development is performed, and the unhardened portions of the resist are removed to pattern the resist. Next, etching is performed by using the patterned resist as a mask so as to selectively remove the film made of Cr, thereby patterning the film. Then, the resist is removed. As a result, the step films 7 are formed together with the TFTs and the signal lines.

In the present embodiment, in plan view, the area of the step films 7 is made smaller than the area of the columnar spacers 13, so that the step films 7 are formed inside the columnar spacers 13. As a result, the contact area between the columnar spacers 13 and the active matrix substrate 2 can be determined by the size of the step films 7. The step films 7 can be produced by a semiconductor process, thereby making the step films 7 higher in form accuracy than the columnar spacers 13.

The following is a description about the form accuracy of the columnar spacers 13 and the step films 7. As described above, the columnar spacers 13 are exposed by the proximity system, and the step films 7 are exposed by, e.g. the lens projection system. When the resist for TFTs is exposed by these systems, the line width variation (3σ) is 0.7 µm in the proximity system, and is 0.4 µm in the lens projection system. Concerning the formation of the columnar spacers, the line width variation is further increased to be 2.0 µm under the condition where the material used is not a resist for TFTs but a resist material optimized for columnar spacers, and that the developing solution, which is generally disposed in the formation process of TFTS, is circulated in the formation process of the columnar spacers. On the other hand, concerning the formation of the step films, the line width variation increases only by 0.1 µm or so in the etching process and is as small as 0.5 µm. Thus, the line width variation in the formation of the columnar spacers is 2.0 µm, while the line width variation in the formation of the step films can be as small as 0.5 µm, thereby making the step films have higher form accuracy than the columnar spacers.

Consequently, the contact area between the columnar spacers 13 and the active matrix substrate 2 can be controlled with a high degree of accuracy so as to make it uniform. This can make the gap between the active matrix substrate 2 and the color filter substrate 3 uniform. This results in a reduction in variations in luminance, chromaticity and contrast.

In the present embodiment, of the columnar spacers 13, the columnar spacers 13*a* are made to be constantly in contact with the active matrix substrate 2, and a clearance is provided between the columnar spacers 13*b* and the protective film 8. As a result, when no external force is applied on the liquid crystal display device, the columnar spacers 13*a* are exclusively in contact with the active matrix substrate 2, so that the frictional force between the active matrix substrate 2 and the color filter substrate 3 is low. Therefore, even when there is a dislocation between the active matrix substrate 2 and the color filter substrate 3 due to the application of an external force, the dislocation disappears with the disappearance of the external force. This can prevent the occurrence of display unevenness from a dislocation between the substrates. On the other hand, when a force is applied in the direction of making the active matrix substrate 2 and the color filter substrate 3 approach each other, a compressive force is applied on the columnar spacers 13*a* to elastically deform them, thereby making the tips of the columnar spacers 13*b* come into contact with the color filter substrate 2, and eventually holding the gap between the substrates by both the columnar spacers 13*a* and 13*b*. As a result, the columnar spacers 13*a* and 13*b* are prevented from being plastically deformed so as to prevent the occurrence of display unevenness.

In addition, in the present embodiment, the step films 7 can be formed in the same step as the TFTs, the signal lines and the like. This means that the provision of the step films 7 does not increase the production cost of the liquid crystal display device. Furthermore, since the columnar spacers 13 are provided in the regions where the black matrix 10 and the color filters 11 are overlapped with each other, the columnar spacers 13 are not inside the openings 10a, the open area ratio of the liquid crystal display device does not decrease. Furthermore, the height of the columnar spacers 13 can be suppressed by mounting them on the black matrix 10 and the color filters 11.

In the present embodiment, one out of every four columnar spacers is made to be in contact with the active matrix substrate. However, the present invention is not limited to this example, and it is also possible to make all the columnar spacers in contact with the active matrix substrate. In this case, the step films may be provided in the positions corresponding to all the columnar spacers. This can maximize the force to hold the gap between the substrates in respect with the number of columnar spacers.

Although the step films 7 are made of Cr in the present embodiment, the present invention is not limited to this example, and they may be made of other metals such as aluminum (Al), or alloys. It is also possible to make the step films 7 from a multilayered film consisting of a plurality of metal or alloy layers. However, the step films 7 are preferably made from the same material as the signal lines so as not to add an additional process.

What is claimed is:

1. A liquid crystal display device comprising:
   a color filter substrate, said color filter substrate comprising:
      a first substrate; and
      spacers formed on said first substrate;
   an active matrix substrate which is opposed to a surface of said color filter substrate on which said spacers are formed, said active matrix substrate comprising:
      a second substrate;
      a pixel circuit which is formed on a surface of said second substrate that is opposed to said color filter substrate; and
      films which are formed locally in at least some of the regions on said second substrate that are opposed to said spacers, and which make steps at the surface of said active matrix substrate, said steps being in contact with said spacers, and the contact region between said step and said spacer being disposed inside the periphery of the contact surface of said spacer; and
   a liquid crystal layer which is disposed between said color filter substrate and said active matrix substrate.

2. The liquid crystal display device according to claim 1, wherein said pixel circuit comprises:
   a scan line;
   a signal line; and
   a thin film transistor connected with said scan line and said signal line, and
   said films formed locally are made of same material as said signal line and are formed on a same layer as said signal line.

3. The liquid crystal display device according to claim 2, wherein said films formed locally are formed in a same step as said signal line.

4. The liquid crystal display device according to claim 1, wherein said spacers are made by forming a first film on the surface of said first substrate, exposing said first film by a proximity system, and developing said first film for patterning, and said films formed locally are made by forming a second film on the surface of said second substrate, forming a resist on said second film, exposing said resist by a lens projection system or a mirror projection system, developing said resist for patterning, and etching said second film using said patterned resist as a mask.

5. The liquid crystal display device according to claim 1, wherein said films formed locally are exclusively formed in some of the regions on said second substrate that are opposed to said spacers.

6. The liquid crystal display device according to claim 1, wherein said color filter substrate has black matrixes and color filters which are formed on said first substrate, said spacers are formed in regions where said black matrix and said color filter are overlapped with each other, and said films formed locally are formed on said scan line.

* * * * *